United States Patent [19]

Graham et al.

[11] Patent Number: 4,471,411

[45] Date of Patent: Sep. 11, 1984

[54] VEHICLE BODY TAILLAMP ASSEMBLY

[75] Inventors: Eric F. Graham, Sterling Heights; George J. Huck, Washington; Arthur D. Ortland, Warren, all of Mich.

[73] Assignee: General Motors Corporation, Detroit, Mich.

[21] Appl. No.: 424,469

[22] Filed: Sep. 27, 1982

[51] Int. Cl.³ .......................... B60Q 1/26; E05D 9/00
[52] U.S. Cl. ..................................... 362/80; 16/378;
   16/386; 248/240.1; 248/293; 340/67; 340/84;
   340/87; 362/232; 362/269; 362/287; 362/365;
   362/368; 362/427
[58] Field of Search ....................... 362/61, 66, 80, 82,
   362/83, 232, 238, 250, 269, 273, 277, 285, 287,
   289, 319, 322, 371, 372, 418, 427, 365, 368;
   340/67, 84, 87; 248/240.1, 293; 296/76, 195;
   16/378, 386

[56] References Cited

U.S. PATENT DOCUMENTS

| D. 165,678 | 1/1952 | Cawthon | 248/240.1 X |
|---|---|---|---|
| 1,157,701 | 10/1915 | Kratz | 362/269 |
| 1,227,640 | 5/1917 | Marquardt | 248/240.1 X |
| 2,314,710 | 3/1943 | Keller | 362/80 X |
| 2,403,904 | 7/1946 | Blomberg | 248/292 |
| 2,606,772 | 8/1952 | Mead et al. | 362/80 X |
| 2,654,830 | 10/1953 | Runge et al. | 362/269 |
| 2,698,403 | 12/1954 | Woodham | 340/66 X |
| 2,812,955 | 11/1957 | Urban et al. | 362/80 X |
| 2,824,753 | 2/1958 | La Voie | 362/83 X |
| 3,109,159 | 10/1963 | Jordan et al. | 362/80 X |
| 3,363,745 | 1/1968 | Thuerman et al. | 16/386 X |
| 3,680,910 | 8/1972 | Stanner | 296/76 X |
| 3,982,119 | 9/1976 | Aluzzo et al. | 362/232 |
| 4,054,789 | 10/1977 | Romanelli | 362/80 |
| 4,227,737 | 10/1980 | Vogt | 296/76 |
| 4,251,103 | 2/1981 | Nakajima et al. | 296/195 |
| 4,379,360 | 4/1983 | Papsdorf | 16/386 |

FOREIGN PATENT DOCUMENTS 124981 5/1949 Sweden .................... 362/269

Primary Examiner—David H. Brown
Assistant Examiner—J. E. Griffiths, Jr.
Attorney, Agent, or Firm—Herbert Furman

[57] ABSTRACT

A vehicle body taillamp assembly includes a taillamp finishing panel mounted to the rear end panel of a vehicle body and having spaced pintle portions in its upper edge. A taillamp structure fits within the finishing panel and includes hinge pins received through apertures in the hinge pintle portions to mount the taillamp structure to the finishing panel for movement between a closed position within the finishing panel and an open position outwardly and upwardly of the finishing panel wherein the housing reflector portion and the wiring to the bulbs with the housing reflector portion are exposed for servicing.

5 Claims, 11 Drawing Figures

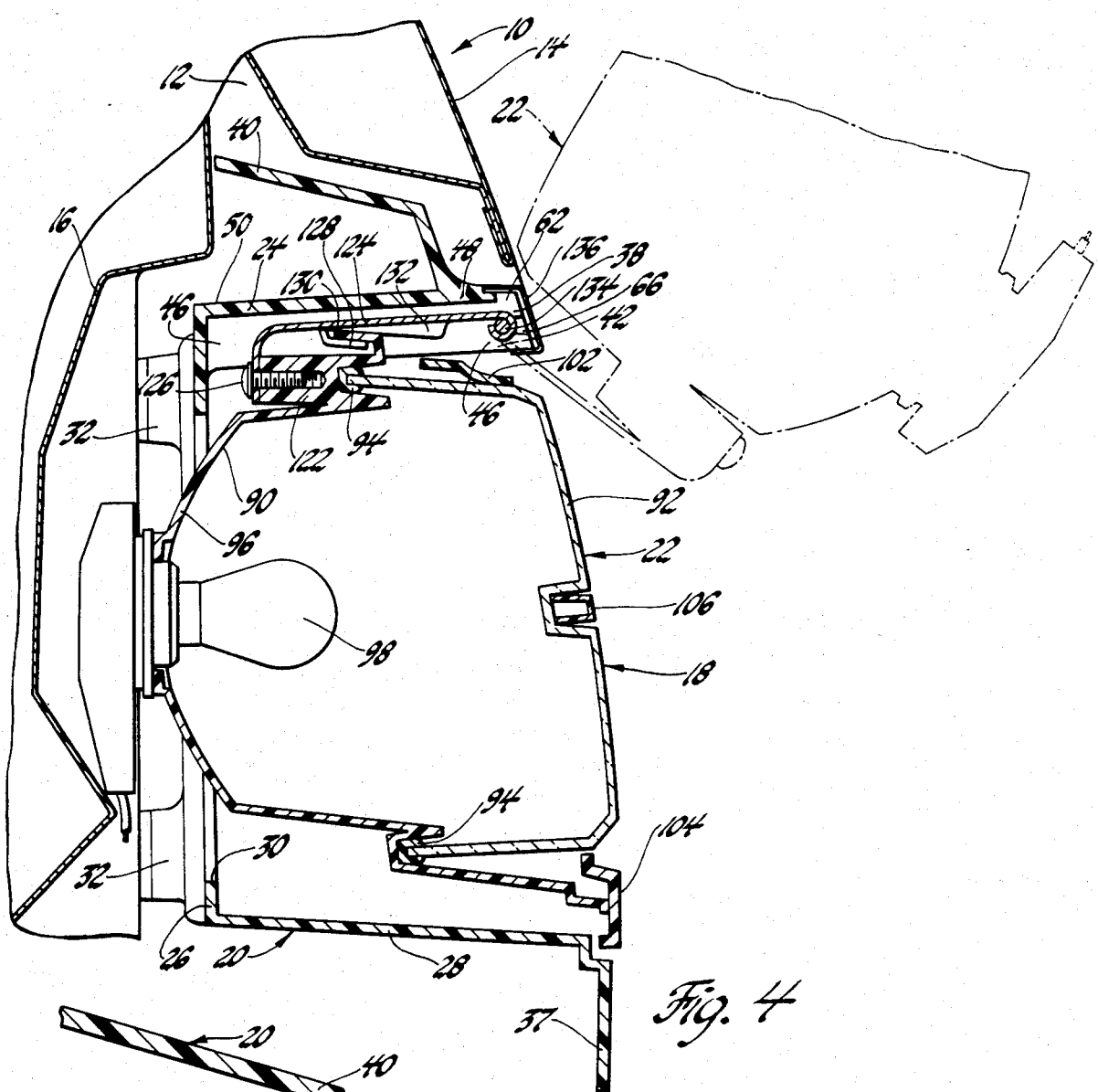
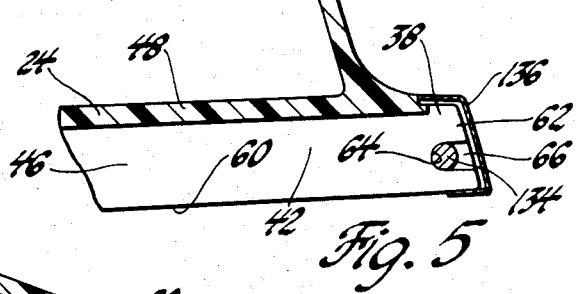
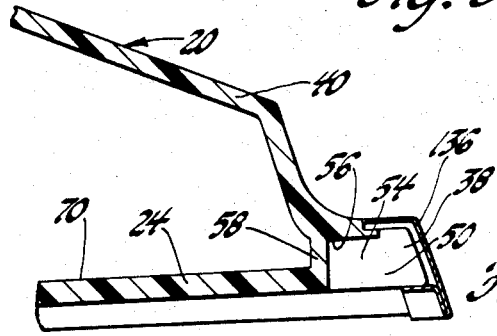
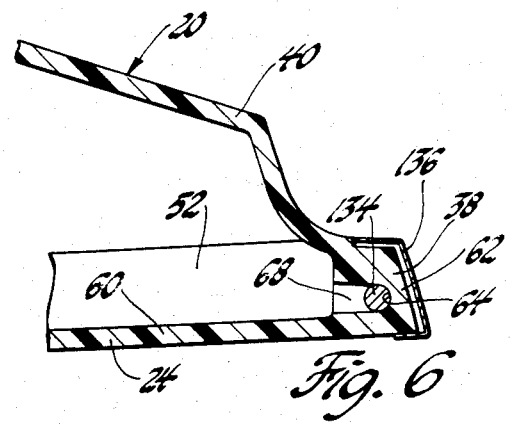

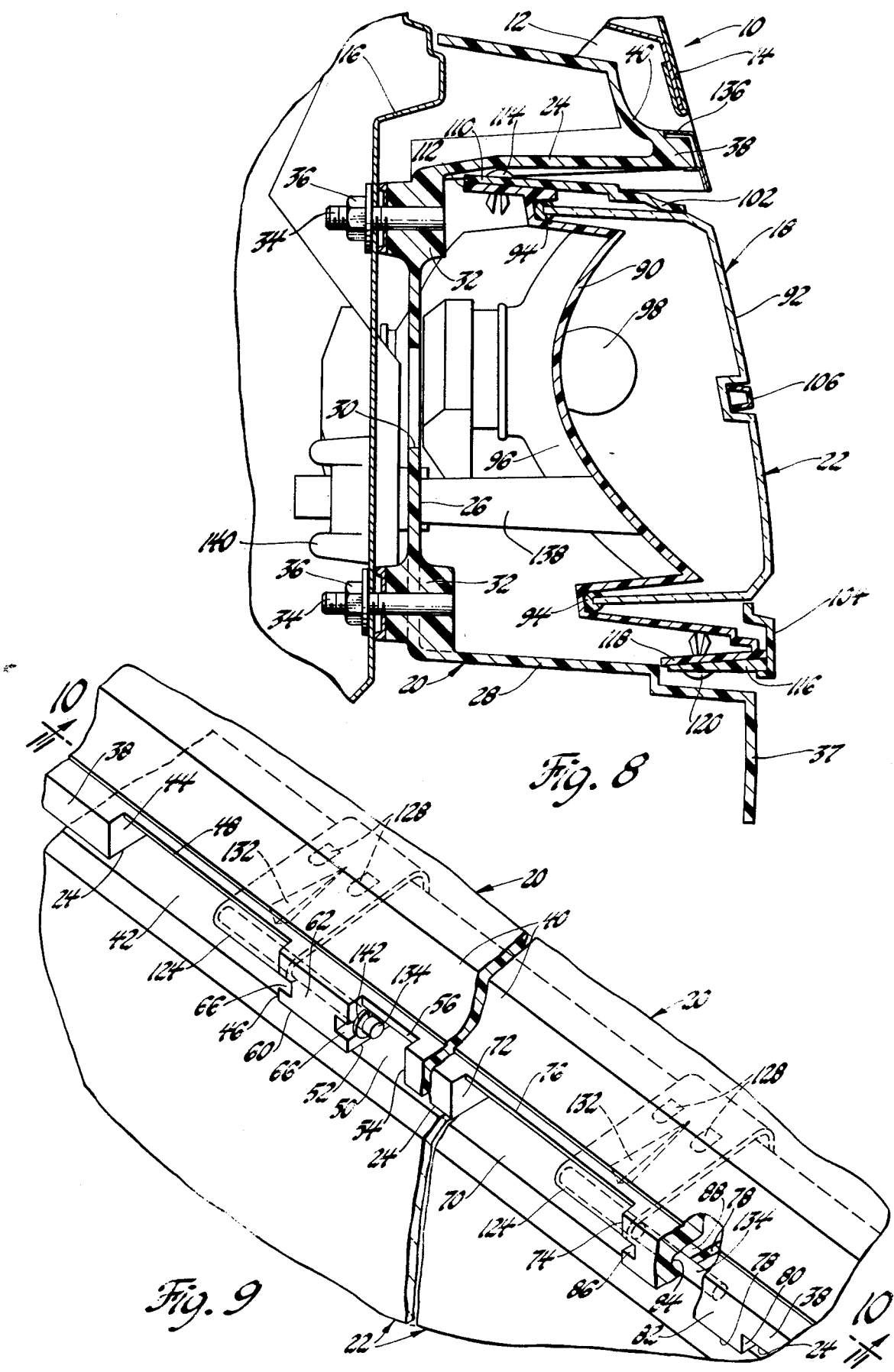

VEHICLE BODY TAILLAMP ASSEMBLY

This invention relates to a taillamp assembly for a vehicle body and more particularly to such a taillamp assembly which includes a body finishing panel mounted to the vehicle body and a taillamp assembly or structure pivoted to the finishing panel for movement to a position outwardly of the finishing panel for servicing.

In the preferred embodiment of the invention, a body finishing panel of molded plastic material is fixed to the rear end panel of the body. This finishing panel provides the rear wall of the trunk or deck area of the body. The trunk is opened and closed by a hinged deck lid which is normally held in closed position by a cooperating lock and striker arrangement between the deck lid and the rear end panel. The finishing panel includes upper and lower walls and a base wall which is secured to the rear end panel to mount the finishing panel to the body. The outer edge of the upper wall of the finishing panel is of thickened cross-section. At two spaced inboard locations, the thickened edge is cut away to provide first and second recesses separated by an inboard hinge pintle portion. The thickened edge is cut away at an outboard location to provide another or third recess. The outer edge outboard of this third recess provides a second or outboard hinge pintle portion. Each hinge pintle portion is apertured and includes a first slot opening outwardly of one end of the aperture and a second slot opening inwardly of the aperture adjacent each outwardly opening slot. The slots permit the aperture to be molded into the thickened edge of the finishing panel. The upper walls of the first and third recesses are offset upwardly of the upper wall of the finishing panel. The first and third recesses are the same and extend to the base wall of the finishing panel. The second recess is shallower and of less extent.

A taillamp structure fits within the finishing panel. The taillamp structure includes an outer lens portion and a housing portion which includes a number of reflectors, each mounting a bulb for a particular purpose.

A pair of spaced inboard and outboard hinge members are mounted to the housing portion of the taillamp structure and extend outwardly therefrom to the lens portion. These hinge members are respectively received within the first and third recesses. Each hinge member mounts a laterally extending hinge pin with one of the hinge pins being inserted in the aperture of the inboard hinge pintle portion and the other hinge pin being inserted in the aperture of the outboard hinge pintle portion.

The first slots of the apertures of the hinge pintle portions provide pilots facilitating assembly of the taillamp structure to the finishing panel. The taillamp structure is positioned outwardly and upwardly of the finishing panel and the end portions of the hinge pins are first laterally inserted into the first slots of the apertures and then longitudinally inserted through the apertures to pivot the taillamp structure to the finishing panel. Thereafter the taillamp structure is swung downwardly within the finishing panel as the hinge members fit within the first and third recesses. The second recess provides access to the free end of the hinge pin of the inboard hinge member so that a retainer can be applied to this hinge pin.

The housing portion of the taillamp structure includes integral bosses. Retainers are insertable from the inside of the trunk area of the body through apertures in the end panel and into engagement with such bosses to normally hold the taillamp structure within the finishing panel. By inserting the retainers from within the trunk, the deck lid must be opened before access can be obtained to the taillamp structure.

When the retainers are disengaged, the taillamp structure can be swung outwardly and upwardly of the finishing panel for servicing of the reflector portion. A molding over the thickened edge covers the recesses and slots.

The primary feature of this invention is that it provides an improved taillamp assembly for vehicle bodies which includes a finishing panel mounted on the body end panel and a taillamp structure which is pivoted to the finishing panel for movement outwardly thereof to expose reflectors of the taillamp structure for service purposes. Another feature is that the taillamp structure includes a housing portion which includes a reflectors, and an outer lens portion, with the taillamp structure being mounted to the body by hinge members secured to the housing portion and including hinge pins pivotally received within apertures of the finishing panel. A further feature is that the finishing panel is formed of molded plastic material and the apertures are molded into hinge pintle portions of an outer edge of the finishing panel. Yet another feature is that the hinge pintle portions include adjacent inwardly and outwardly opening slots to the aperture so that the aperture can be moled with the hinge pintle portion. Yet a further feature is that the outwardly opening slots also provide pilots to one end of the apertures and permit lateral insertion of the hinge pins within the apertures and subsequent longitudinal insertion of the hinge pins through the apertures. Still another feature is that the taillamp structure is held in closed position by retainers which extend from the deck area of the vehicle body so as to be accessible only when the normally locked deck lid is released and opened.

These and other features will be apparent from the following description and drawings wherein:

FIG. 4 is an enlarged sectional view taken generally along line 4—4 of FIG. 3.

FIG. 5 is an enlarged sectional view taken generally along line 5—5 of FIG. 3.

FIG. 6 is an enlarged sectional view taken generally along line 6—6 of FIG. 3.

FIG. 7 is an enlarged sectional view taken generally along line 7—7 of FIG. 3.

FIG. 8 is an enlarged sectional view taken along line 8—8 of FIG. 1.

FIG. 9 is a perspective view of a portion of FIG. 1.

Figure 1:
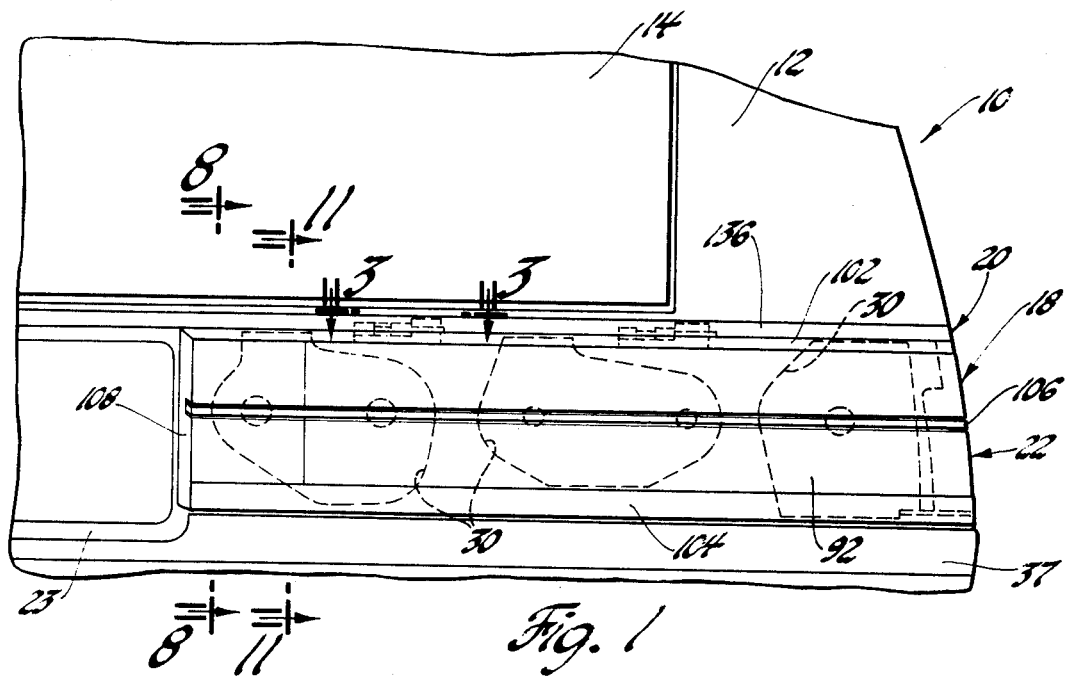
FIG. 1 is a partial rear view of a vehicle body having a taillamp assembly according to this invention.
Figure 2:
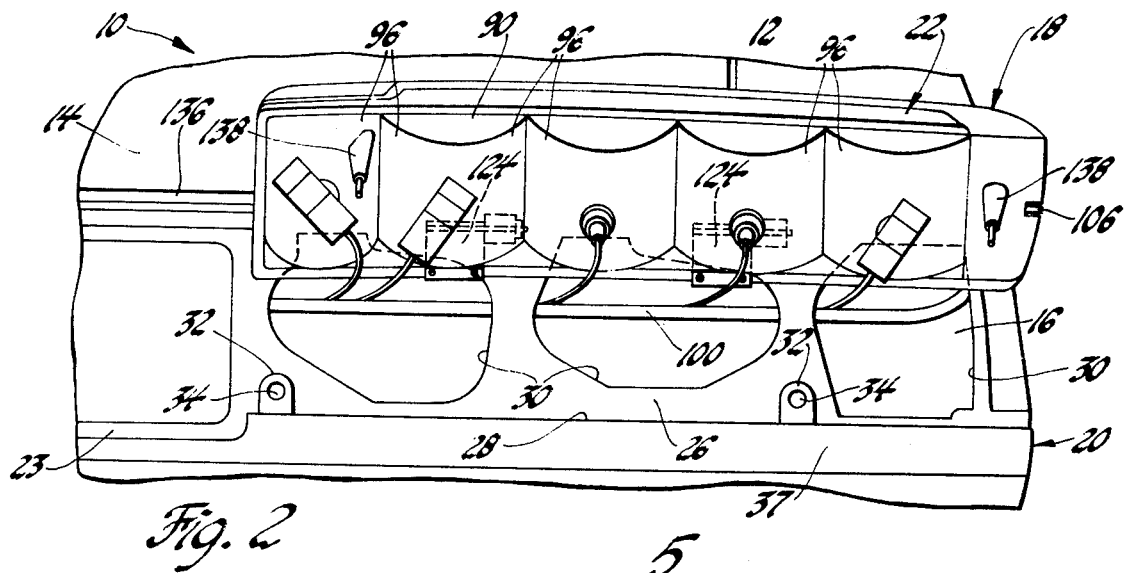
FIG. 2 is a view similar to FIG. 1 showing the taillamp structure in open position.
Figure 3:
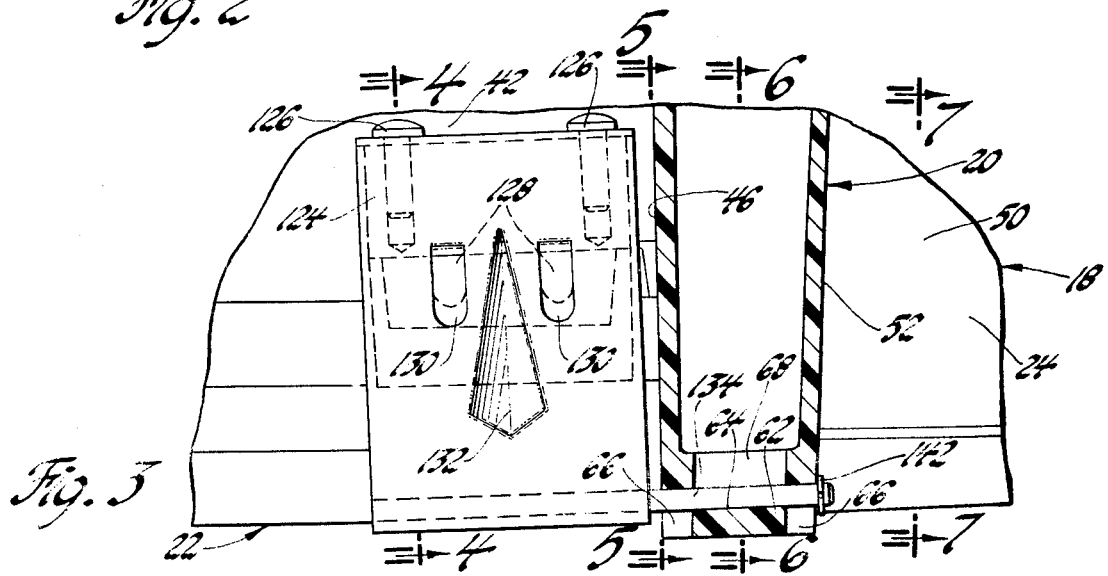
FIG. 3 is an enlarged view taken generally along line 3—3 of FIG. 1.

Referring now particularly to FIG. 1 of the drawings, a vehicle body designated generally 10 includes a trunk or deck compartment 12 which is opened and closed by a deck lid 14, FIGS. 4 and 8, in a conventional manner. The deck lid is mounted to a forward or tulip panel of the body for movement between open and closed positions with respect to the deck compartment 12. The rear edge of the deck lid is conventionally locked to the rear end panel 16, FIGS. 4 and 8, by a key releasable deck lid lock and striker, not shown. The end panel 16 provides the rear wall of the deck compartment 12. The foregoing body and deck lid structure is conventional and forms no part of this invention.

A taillamp assembly 18 according to this invention includes a molded plastic taillamp finishing panel 20 and a taillamp structure 22 which is received within the finishing panel.

It will be understood that a finishing panel 20 and taillamp structure 22 are provided on each side of the rear of body 10. The finishing panels and taillamp structures are the same although of different hand. The finishing panels are interconnected by a license plate mounting portion 23 which may be formed integral therewith or separately therefrom.

As shown in FIGS. 2 through 9, the finishing panel 20 is of generally U-shaped cross-section and includes an upper wall 24, a forward or base wall 26, and a lower wall 28. The base wall 26 is cut out at a number of locations 30, FIG. 2, and is provided with two spaced pairs of integral apertured bosses 32, FIGS. 2 and 8. Each boss mounts a threaded stud 34 which extends forwardly therefrom through a spacer and through the end panel 16 of the body and receives a nut 36, FIG. 8, to secure the finishing panel 20 to the end panel 16 of the body. The lower wall 28 of the panel 20 terminates in a downwardly extending flange 37 which extends to the rear bumper of the body, not shown.

Figure 10:
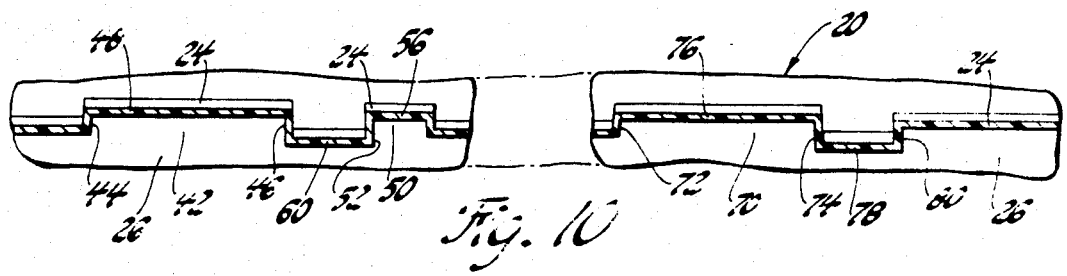
FIG. 10 is a sectional view taken along line 10—10 of FIG. 9.
Figure 11:
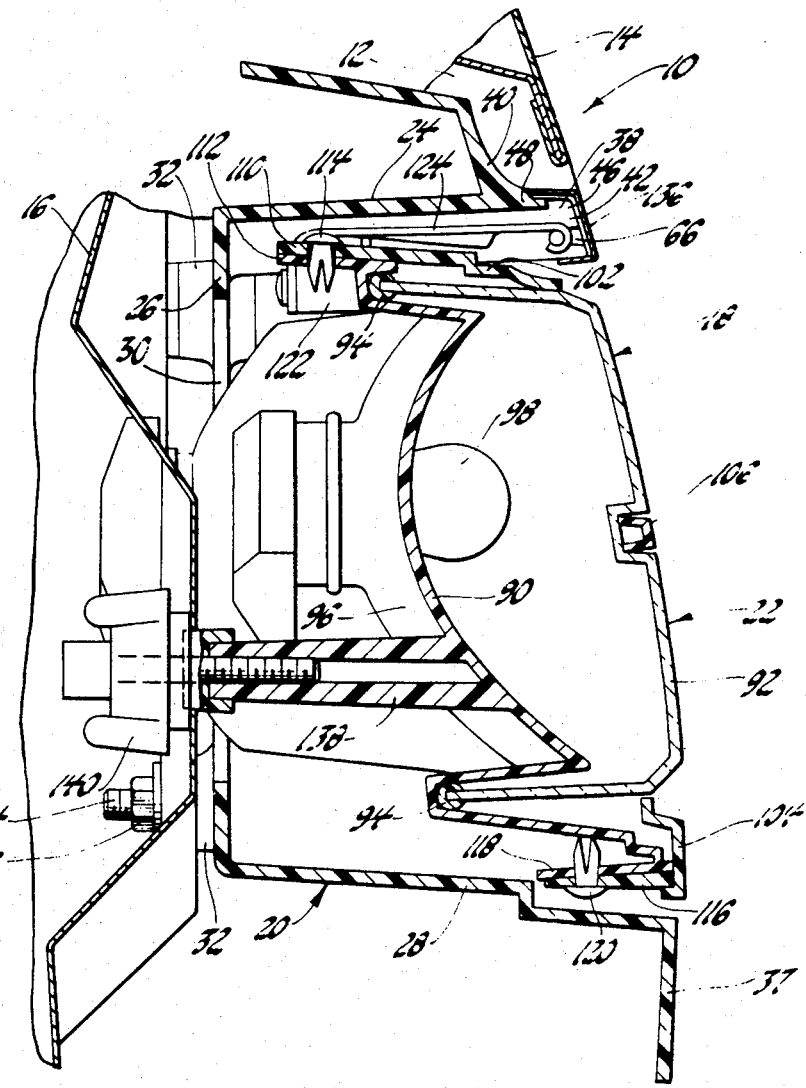
FIG. 11 is an enlarged sectional view taken along line 11—11 of FIG. 1.

The upper wall 24 includes a thickened outer edge 38 which joins the upper wall to an overlying outer wall 40 which underlies the lower edge of the deck lid 4, FIGS. 4 and 8, and extends to the end panel 16. The edge 38 is cut away at a first inboard location to provide a recess or passageway 42, FIGS. 4 and 9, having side walls 44 and 46 and a partial upper wall 48. As shown in FIG. 10, walls 44, 46 and 48 continue recess 42 to wall 26. Edge 38 is also cut away at a second inboard location to provide another recess 50 which is shallower and narrower than the recess 42 and has side walls 52 and 54, a partial upper wall 56 and a forward wall 58, FIG. 7 which joins wall 56 to wall 24. A lower wall 60 joins walls 46 and 52. The portion of the edge 38 between recesses 42 and 50 provides an inboard hinge pintle portion 62, FIGS. 4, 5 and 6. This hinge pintle portion includes an aperture 64 extending therethrough and opening to recesses 42 and 50. A slot 66 opens outwardly of the inboard and outboard ends of the aperture 64 and a slot 68 opens inwardly of the aperture 64 intermediate the slots 66.

The edge 38 is cut away at a third location to provide a third recess 70 which is generally the same width as the recess 42 and likewise includes an inboard side wall 72 of the same depth as wall 44, an outboard side wall 74 of the same depth as wall 46 and an upper wall 76. Walls 72, 74 and 76 continue recess 70 to wall 26. A lower wall 78, corresponding to wall 60, joins wall 74 to a wall 80, corresponding to wall 52 and joining to wall 24, FIG. 10. Walls 48 and 76 are generally coplanar to each other and walls 60 and 78 are generally coplanar to each other. Walls 74, 78 and 80 and edge 38 provide an outboard hinge pintle portion 82. An aperture 84 which is the same as the aperture 64 is provided in the hinge pintle portion 82. An outwardly opening slot 86 is provided at the inboard end of this aperture and an inwardly opening slot 88, the same as slot 68 is provided adjacent the slot 86. There is no additional slot 86 provided at the outboard end of aperture 84 since the inwardly opening slot 88 opens to the full length of the aperture other than the slot 86 opening to the inboard end thereof.

The slots 66 and 68 and 86 and 88 permit the apertures 64 and 84 to be molded during the molding of the finishing panel 20 rather than requiring the apertures to be drilled or otherwise formed in the finishing panel after molding. The inboard slot 66 and slot 86 also have an additional purpose as will be described.

The taillamp structure 22 includes an inner housing portion 90 and an outer lens portion 92 which are conventionally secured together at 94. The housing portion includes a series of lamp housings or reflectors 96, FIG. 2, each of which conventionally mounts a bulb 98 connected in a suitable manner to a wiring harness 100 which extends between the base wall 26 of the panel 20 and the end panel 16 and is connected to the conventional vehicle wiring assembly. A molding for the lens portion includes an upper leg 102, a lower leg 104, a center leg 106 and a pair of side legs 108, only the inboard being shown. The upper leg 102 at spaced locations includes inwardly extending tabs 110 which are secured to tabs 112 of the reflector portion by plastic nails 114. Likewise, at spaced locations tabs 116 of the lower leg 104 are secured to tabs 118 of the reflector portion by plastic nails 120.

The housing portion includes a spaced pair of integral inwardly extending tapped abutments or bosses 122, FIG. 4, which extend inwardly from the upper wall thereof. A hinge member 124 has its forward flanged end bolted at 126 to each boss 122 to fix the hinge members to the taillamp structure 22. The hinge members extend rearwardly and outwardly of the taillamp structure and each includes a pair of lanced tabs 128 hooked under a reverse bent flange portion 130 integral with each boss 122. Each hinge member also includes a strengthening rib 132. A hinge pin 134 extends laterally of the rearward end of each of the hinge members and is secured to the hinge member by wrapping the rearward end of the hinge member around the hinge pin. Each hinge pin 134 is received in a respective aperture 64 and 84 in the hinge pintle portions 62 and 82 formed in the upper edge 38 of the finishing panel 20 to thereby pivotally mount the taillamp structure 22 to the housing for movement between a normal or closed position shown in FIGS. 1, 4, 8 and 11 wherein the taillamp structure is located within the finishing panel 20, and an open position shown in FIG. 2 and in dash lines in FIG. 4 wherein the taillamp structure is pivoted outwardly and upwardly of finishing panel 20 to an open position wherein the reflectors 96 of the housing portion are exposed so that the bulbs 98 and the wiring to the pulbs are easily accessible for service.

A generally U-shaped molding 136, FIGS. 1, 4, 6, 8 and 11 fits over the upper edge portion 38 of housing 20 to conceal the rearward openings of the recesses 42, 50 and 70 as well as the slots 66 and 86.

When the taillamp structure is in the normal or closed position, portions of the reflectors 96 are received within the cutouts 30. The taillamp structure additionally includes a pair of inwardly extending integral bosses 138 which extend through the openings 30 to a position adjacent the rear end panel 16, FIGS. 2 and 11. A wing nut headed screw member 140 extends from within the deck area 12 through end panel 16 and is received within each boss 138 to fix the taillamp structure in its normal position.

When the taillamp structure 22 is mounted to the finishing panel 20, the end portions of the hinge pins 134 are initially inserted laterally into the inboard slot 66 and slot 86 while the tallamp structure is located in the open position. The rearward ends of the hinge members are received within the rearward openings of recesses 42 and 70. The inboard slot 66 and slot 86 thus function as pilot openings during assembly of the taillamp structure to the finishing panel 20. Thereafter, the taillamp structure is shifted outboard or to the right as viewed in FIGS. 1 and 2 to fully insert the hinge pins 134 in the apertures 64 and 84 to pivotally mount the taillamp structure 22 to the finishing panel 20. The inboard hinge pin projects from the hinge pintle 62 into the recess 50 and a suitable retaining washer or clip 142 is fixed thereto to retain both hinge pins within their respective apertures 64 and 84 and locate both hinge members 124 adjacent the outboard walls 46 and 74 of recesses 42 and 70 respectively. These recesses must be sufficiently wide to accept both a hinge member and hinge pin during assembly of the taillamp structure to the finishing panel 20. The purpose of the recess 50 is to provide access to the clip 142. The molding 136 is mounted to the edge 38 after the assembly of the taillamp structure to the housing.

Whenever it is desired to obtain access to a bulb 98 or to the wiring harness 100, the deck lid is unlocked and opened and the members 140 are unthreaded from bosses 138. Thereafter, the taillamp structure 22 can be swung outwardly and upwardly of the finishing panel 20 for servicing as pins 134 rotate in apertures 64 and 84.

Thus this invention provides a vehicle body taillamp assembly having a taillamp structure which can be pivoted outwardly and upwardly of the body for servicing.

The embodiments of the invention in which an exclusive property or privilege is claimed are defined as follows:

1. A taillamp assembly for a vehicle body comprising, in combination,
    a molded plastic finishing panel,
    a taillamp structure including a lens portion and a housing portion having at least one reflector,
    a pair of spaced hinge members mounted on said housing portion of said taillamp structure, each said hinge member including a laterally extending hinge pin,
    said finishing panel including a spaced pair of apertured hinge pintle portions and a pair of recesses, each recess being located to one side of a respective one of said hinge pintle portions, each said recess receiving one of said hinge members and each said respective hinge pintle portion pivotally receiving said hinge pin of said one hinge member to pivotally mount said taillamp structure on said finishing panel for movement between a closed position adjacent said finishing panel, and an open position wherein said taillamp structure is swung upwardly and outwardly of said finishing panel to provide access to said reflector for servicing.
    each said hinge pintle portion including a slot opening outwardly of one end of said aperture thereof and providing a pilot for lateral insertion of an end of said hinge pin within said one end of said aperture and subsequent longitudinal insertion of said hinge pin through said aperture.

2. A taillamp assembly as recited in claim 1 including a molding secured to said hinge pintle portions and covering said portions and said outwardly opening slots thereof.

3. A taillamp assembly for a vehicle body having a body rear end panel comprising, in combination,
    a molded plastic finishing panel mounted on the body rear end panel and including a horizontally elongated opening having an upper wall and an outer edge, a taillamp structure received within said opening of said finishing panel and including an outer lens portion and an inner housing portion having an upper wall facing said upper wall of said finishing panel and spaced therefrom, and at least one reflector,
    a pair of spaced hinge members mounted on said upper wall of said housing portion of said taillamp structure, each said hinge member including a laterally extending hinge pin,
    said outer edge of said finishing panel including a spaced pair of apertured hinge pintle portions molded as an integral part thereof, each said hinge pintle portion being respective to one of said hinge pins and pivotally receiving said one hinge pin to pivotally mount said taillamp structure on said outer edge of said finishing panel for movement between a closed position wherein said taillamp structure is located within said opening of said finishing panel and an open position wherein said taillamp structure is swung upwardly and outwardly of said opening of said finishing panel to provide access to said reflector for servicing,
    each said hinge pintle portion including a slot opening outwardly of one end of said aperture thereof and providing a pilot for insertion of an end of said one respective hinge pin within said one end of said aperture and subsequent insertion of said hinge pin through said aperture, each said hinge pintle portion further including a slot opening inwardly of said aperture adjacent each said outwardly opening slot, said inwardly and outwardly opening slots in said each hinge pintle portion permitting said aperture to be molded integrally with said outer edge of said finishing panel.

4. A taillamp assembly for a vehicle body having a body rear end panel comprising, in combination,
    a molded plastic finishing panel including a horizontally elongated opening having a base wall mounted on the body rear end panel, an upper wall having an outer edge, and a lower wall, a taillamp structure received within said opening of said finishing panel and including an outer lens portion extending between said upper and lower walls of said finishing panel and an inner housing portion having an upper wall facing said upper wall of said finishing panel and spaced therefrom, and at least one reflector.
    a pair of spaced hinge members mounted on aid upper wall of said housing portion of said taillamp structure, each said hinge member including a laterally extending hinge pin,
    said outer edge of said finishing panel including a spaced pair of apertured hinge pintle portions and a pair of recesses molded as an integral part thereof, each recess located to one side of a respective one of said hinge pintle portions,each said recess receiving one of said hinge members and each said respective hinge pintle portion pivotally receiving said hinge pin of such hinge member to pivotally mount said taillamp structure on said finishing panel for movement between a closed position within said opening of said finishing panel, and an open position wherein said taillamp structure is swung upwardly and outwardly of said opening of said finishing panel to provide access to said reflector for servicing, each said hinge pintle portion including a slot opening outwardly of one end of said aperture thereof and providing a pilot for insertion of an end of said one respective hinge pin within said one end of said aperture and subsequent insertion of said hinge pin through said aperture, each said hinge pintle portion further including a slot opening inwardly of said aperture adjacent each said outwardly opening slot, said inwardly and outwardly opening slots in ach said hinge pintle portion permitting said aperture to be molded integrally with said outer edge of said finishing panel.

5. A taillamp assembly as recited in claim 4 including a molding secured to said outer edge of said finishing panel and covering said hinge pintle portions and said outwardly opening slots.

* * * * *